United States Patent [19]
Masamura et al.

[11] Patent Number: 5,590,829
[45] Date of Patent: Jan. 7, 1997

[54] MOVABLE BACKING SYSTEM

[75] Inventors: Akitoshi Masamura; Yuichi Kimura; Akio Iwasaki, all of Hirakata, Japan

[73] Assignee: Kabushiki Kaisha Komatsu Seisakusho, Tokyo, Japan

[21] Appl. No.: 495,653
[22] PCT Filed: Jan. 27, 1993
[86] PCT No.: PCT/JP93/00093
  § 371 Date: Oct. 18, 1995
  § 102(e) Date: Oct. 18, 1995
[87] PCT Pub. No.: WO94/16856
  PCT Pub. Date: Aug. 4, 1994
[51] Int. Cl.⁶ .................................................. B23K 37/02
[52] U.S. Cl. ............................................................ 228/50
[58] Field of Search ............................................... 228/50

[56] References Cited

U.S. PATENT DOCUMENTS 5,449,107  9/1995  Umeno et al. ............................ 228/50

FOREIGN PATENT DOCUMENTS

| | | |
|---|---|---|
| 53-20460 | 6/1978 | Japan . |
| 55-158899 | 12/1980 | Japan . |
| 58-31279 | 7/1983 | Japan . |
| 58-32856 | 7/1983 | Japan . |
| 60-23115 | 7/1985 | Japan . |
| 04200867A | 7/1992 | Japan . |
| 5458 | 3/1994 | WIPO ................................ 228/50 |

Primary Examiner—Kenneth J. Ramsey
Attorney, Agent, or Firm—Millen, White, Zelano & Branigan, P.C.

[57] ABSTRACT

A movable backing system enables it to continuously, easily perform full penetration welding along a weld line in a confined space, irrespective of the length, configuration and other factors of a weld zone. A weld backing, which has a backing member disposed on the side facing a workpiece and cooling means disposed inside the weld backing for cooling the backing member, is so supported on a wheeled carriage as to be movable toward the workpiece. The weld backing is provided with follower elements which are always in contact with the underside of the workpiece and which turn following the movement of the workpiece to keep a predetermined gap between the underside of the workpiece and the weld backing so that desired bead thickness can be obtained. The wheeled carriage is moved synchronously with the movement of the welder to continuously perform full penetration welding.

31 Claims, 9 Drawing Sheets

MOVABLE BACKING SYSTEM

TECHNICAL FIELD

The present invention relates to a movable backing system for use in full penetration welding which enables weld backing to move along a weld line of a workpiece.

BACKGROUND ART

There has been widely known several full penetration welding methods in which weld backing is used.

One of them is a method in which a weld backing made from copper is employed. In this method, a weld backing is first formed from copper, with its length identical to the length of the weld line of a workpiece to be welded and its configuration fitting to the shape of the weld line. Such a weld backing is held against the underside of the weld zone where a groove is formed and is fixed in position being supported by a number of supporting members. In this condition, a welder is moved along the weld line to weld throughout the entire length of the weld line. After completion of welding, the weld backing as well as its supporting members are removed.

Another method uses ceramic weld backings. According to this method, a number of ceramic backings of adequate shapes are fixedly placed along the entire weld line under the groove face of the weld zone. Then, a welder is moved to weld throughout the entire length of the weld line, and after completion of welding, the ceramic weld backings are all stripped off and removed.

These prior art methods present the following drawbacks. In the first method in which the weld backing made from copper or the like is used, the length of the weld backing should be the same as the length of the weld line. What is more, a weld backing having the same curvature as that of the weld line is required in the case of a bent weld line. Therefore, such a weld backing has no compatibility and as the weld line becomes longer, the cost of the material, processing and application increases.

Although the second method using ceramic weld backings is adaptive to a weld line in any conditions, the installation and removal of the backings by hand methods is indispensable, which is an obstacle to the realization of automated welding work. Further, the ceramic weld backings cannot be reused after removal, resulting in an increase in the cost. Another disadvantage of the second method is that if the workpiece is, for example, in the form of a box with a confined interior space such as a boom of a crane, backing work cannot be carried out.

Attempts have been made to overcome these drawbacks. For example, mobile weld backing positioners, in which a weld backing is mounted on a wheeled carriage and moved along a weld line, are disclosed in Japanese Patent Publication No. 53-20460 (1978) and in Japanese Patent Publication Laid Open No. 55-158899 (1980).

These publications teach the use of a backing tape and a backing board in combination as a weld backing. A wheeled carriage traveling on rails is provided with tension springs, links and other members. The backing board and the backing tape affixed to the upper face of the backing board are pressed against the underside of the groove face of a workpiece with a predetermined pressure, using the tension springs and other members. By mounting a backing on a wheeled carriage, the foregoing problems can be solved to some extent.

The mobile weld backing positioners disclosed in the above publications, however, require a backing tape to be interposed between a workpiece and the backing board, so that the cost inevitably increases. In addition, troublesome work for affixing the backing tape along a weld line and stripping it after completion of welding is necessary. This method cannot be applied when the space to be welded is too narrow to provide rails or to affix the backing tape. The use of the backing tape also makes it difficult to apply the method to welding of a corner joint.

DISCLOSURE OF THE INVENTION

The present invention has been made in consideration of the foregoing problems and therefore one of the objects of the invention is to provide a movable backing system which enables it to continuously, easily perform full penetration welding along a weld line within a confined space, irrespective of the length, shape and other factors of a weld zone.

According to the invention, there is provided a movable backing system for use in full penetration welding, placed at the underside of a workpiece during welding, the system comprising:

(a) a wheeled carriage movable along a weld line of a weld zone in the workpiece;

(b) a weld backing which is so supported on the wheeled carriage as to be movable toward the workpiece and which has a backing member disposed on the side facing the workpiece and cooling means disposed inside the weld backing, for cooling the backing member;

(c) follower elements attached to the weld backing, which are always in contact with the underside of the workpiece and which turn following the movement of the workpiece to keep a predetermined gap between the underside of the workpiece and the weld backing so that desired bead thickness can be obtained; and (d) an elastic member for energizing the weld backing to bring the follower elements into contact with the underside of the workpiece constantly.

Optionally, the wheeled carriage incorporated in the backing system of the invention includes a cylinder for moving the weld backing apart from the workpiece against the energizing force of the elastic member. It is preferable that the wheeled carriage be provided with a plurality of arms which project from both sides of the wheeled carriage in directions transverse to the travel direction of the wheeled carriage and each of which has, at its leading end, a guide roller for guiding travel of the wheeled carriage. In this case, the arms may be telescopic so that they can be stretched and shrunk by cylinders. The wheeled carriage may be of the mobile-type or may move, being pulled or pushed by a driving unit composed of a rack and pinion mechanism. The wheeled carriage may move synchronously with the movement of a welder.

Preferably, the cooling means is cooling water circulating within the weld backing. Such cooling water is introduced from an inlet positioned on one side of the hollow, rectangular-parallelepiped weld backing and discharged from an outlet positioned on the other side. These inlet and outlet are preferably positioned so as to be offset from each other. The cooling water may be introduced from an inlet positioned at the bottom of the hollow, rectangular-parallelepiped weld backing and discharged from an outlet positioned at the bottom of the weld backing, and a weir may be disposed in a place of the bottom face situated between the inlet and the outlet.

The weld backing may include detecting means for detecting the presence of a workpiece and the wheeled carriage may include detecting means for detecting the travel speed of the wheeled carriage.

The weld backing is mounted on the wheeled carriage such that it is inclined at a predetermined angle in a direction transverse to the travel direction of the wheeled carriage and such that it is movable toward the inclining direction.

Such an inclined weld backing may be substantially pentagonal in section and its end may be chamfered. The chamfered end may be positioned so as to face a corner of the workpiece. The weld backing may be tubular in shape.

In the invention, when the wheeled carriage is traveling along the weld line of the workpiece, the follower elements move and follow the workpiece, being in contact with the underside of the workpiece with the help of the energizing force of the elastic member, so that a predetermined gap is kept between the underside of the workpiece and the weld backing to obtain adequate bead thickness. With such arrangement, full penetration welding of long articles and curved articles can be readily carried out. During welding, the weld backing is cooled by the self cooling action of a heat transfer medium such as cooling water and therefore the weld backing can be protected from damage caused by weld heat.

The provision of the cylinder for moving the weld backing apart from the workpiece facilitates the shift of the weld backing between its working position and its idle position. The use of a plurality of arms with guide rollers projecting transversely to the travel direction of the wheeled carriage enables it to guide the wheeled carriage smoothly, when the workpiece in the form of a box having confined interior, such as the boom of a crane, is welded.

The movable backing system of the invention can be used in automatic welding to carry out full penetration welding synchronously with the movement of a welder.

The detecting means provided in the weld backing, for detecting the presence of a workpiece and the detecting means provided in the wheeled carriage, for detecting the travel speed of the wheeled carriage facilitate detection of a welding position.

The invention is applicable not only to butt joint welding but also to corner joint welding, by virtue of the arrangement in which the weld backing is mounted on the wheeled carriage such that it is inclined at a predetermined angle in a direction transverse to the travel direction of the wheeled carriage and such that it is movable in the inclining direction.

BRIEF DESCRIPTION OF THE DRAWINGS

FIGS. 1 to 13 provide illustrations of embodiments of a movable backing system according to the invention;

BEST MODE FOR CARRYING OUT THE INVENTION

Referring now to the drawings, embodiments of a movable backing system according to the invention will be described below.

First of all, reference is made to FIGS. 1 to 7, for describing a first embodiment of the movable backing system of the invention.

Figure 1:
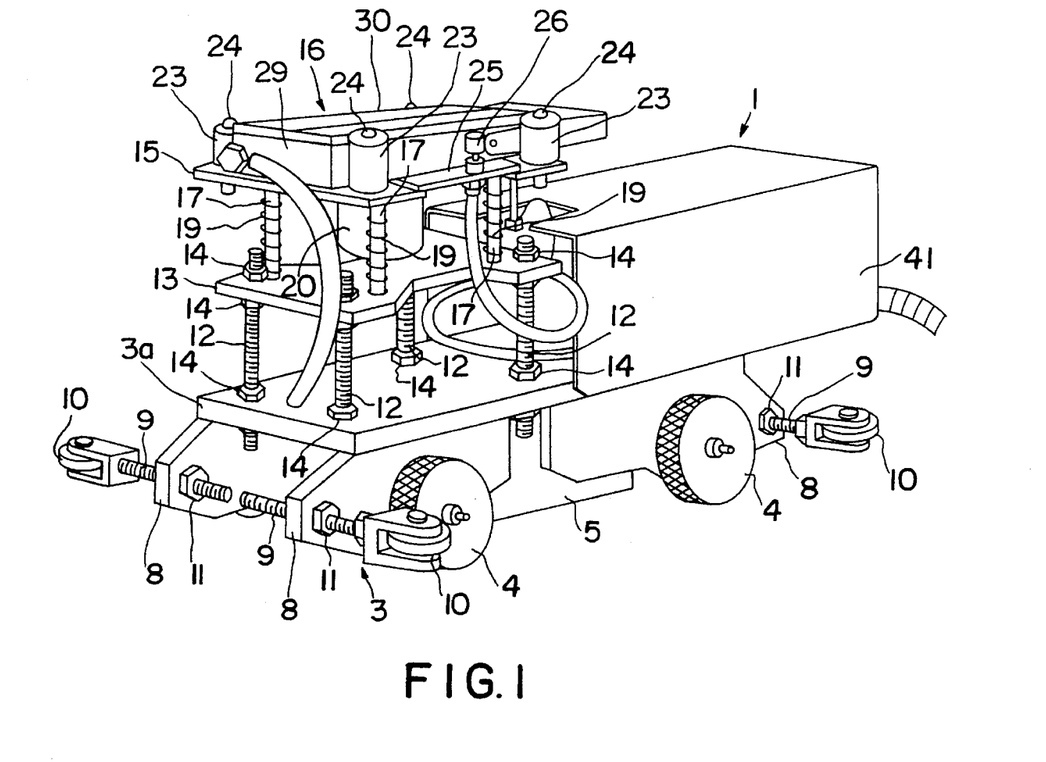
FIG. 1 is a perspective view of a movable backing system according to a first embodiment.
Figure 2:
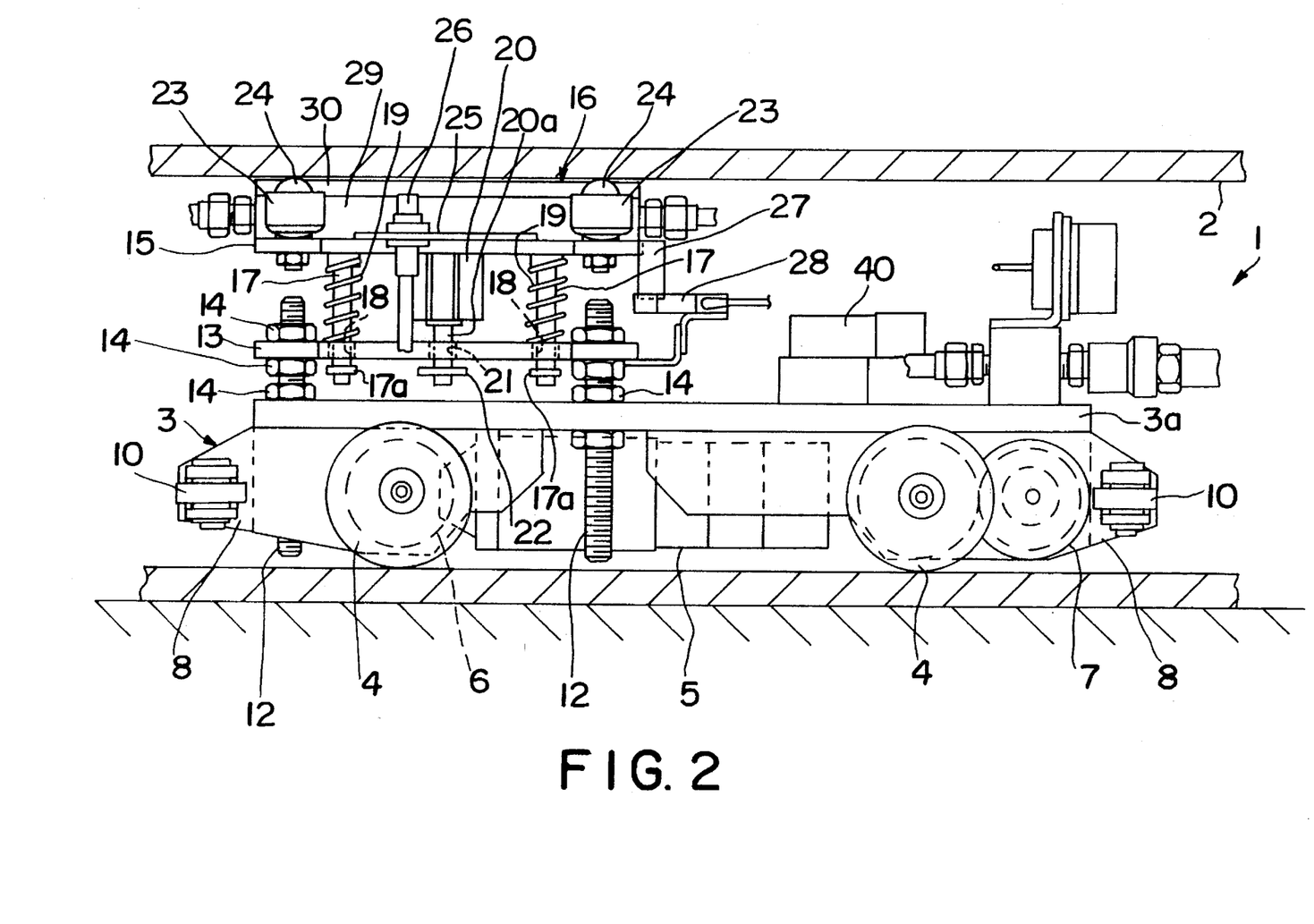
FIG. 2 is a side view of the movable backing system according to the first embodiment.
Figure 3:
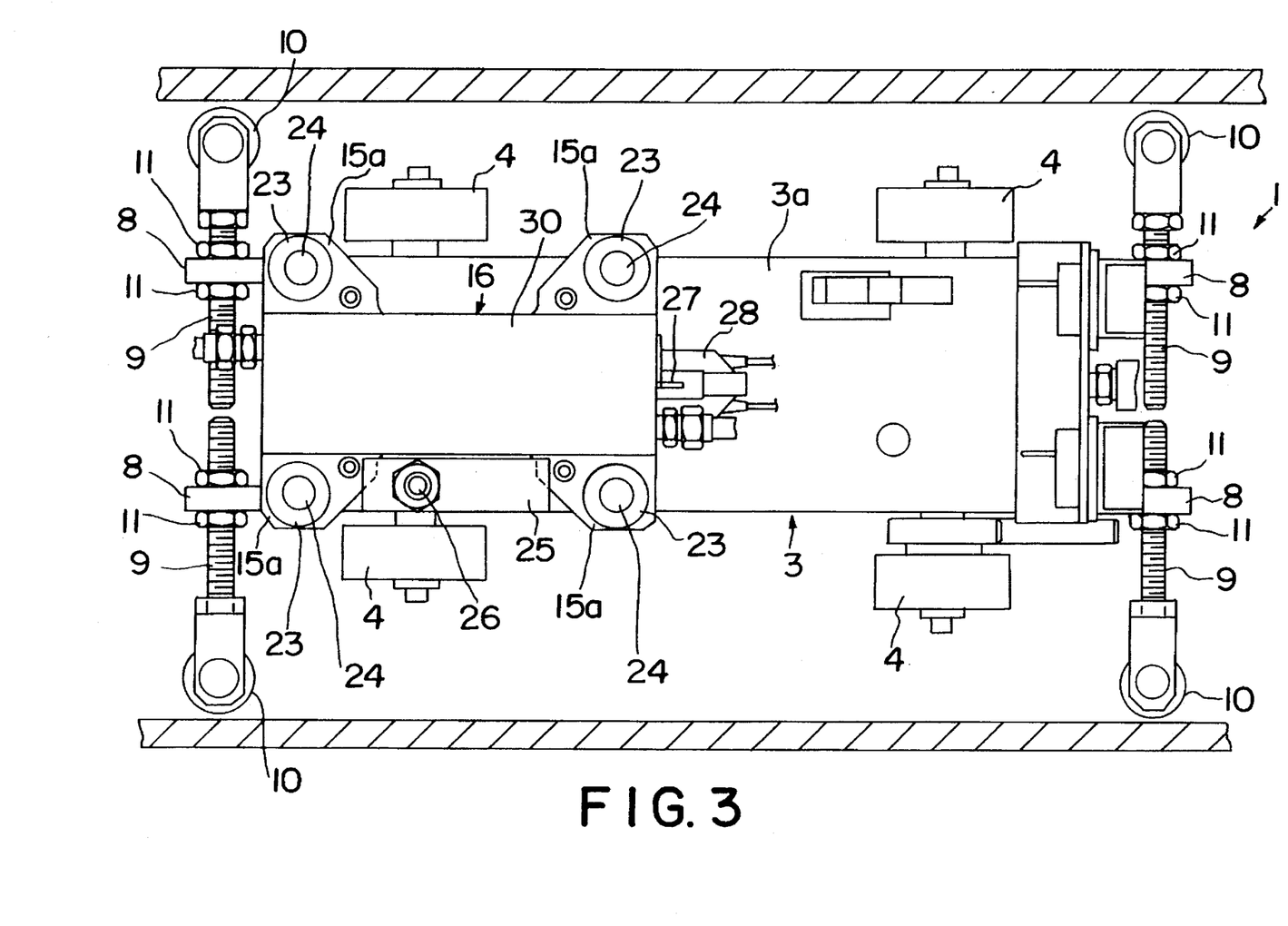
FIG. 3 is a plan view of the movable backing system according to the first embodiment.

A movable backing system 1 of the first embodiment is suited for use in full penetration welding of a box-shaped workpiece 2 and includes a wheeled carriage 3 that is free to move on the inner bottom face of the workpiece 2 in lateral directions in FIGS. 2 and 3. The wheeled carriage 3 has four wheels 4 at the under part thereof. The front wheels 4 (located at the left when viewing FIGS. 2 and 3) are rotated by a DC servo motor 5 equipped with reduction gears through a bevel gear 6. The rear wheels 4 are coupled by gears to a rotary encoder 7 that detects the rotation speed of the wheels 4. The rotary encoder 7 is used to control the travel speed of the wheeled carriage 3 and to detect a welding position.

Brackets 8 are provided at the right and left of the front end and rear end of the wheeled carriage 3. The brackets 8 at the front end project forward while the brackets 8 at the rear end project backward. An arm 9 is screwed in each bracket 8, projecting in a crosswise direction of the wheeled carriage 3. Attached to the tip of each arm 9 is a guide roller 10 that is freely rotatable in a horizontal plane. These guide rollers 10 turn, moving along the side walls of the workpiece 2 when the wheeled carriage 3 moves back and forth, so that the position of the wheeled carriage 3 in a lateral direction is restricted by the guide rollers 10. Two nuts 11 are threaded upon each arm 9 so as to hold the bracket 8 between. By adjusting the positions of the nuts 11 with respect to the arms 9, the extent to which the arms 9 project laterally can be controlled.

Four threaded bars 12 are vertically threaded in an upper plate 3a at front part of the wheeled carriage 3. These threaded bars 12 are also threaded in a supporting plate 13 that is a specified distance apart from the top face of the upper plate 3a. Two pairs of nuts 14 are fitted on each threaded bar 12, in such a manner that the upper plate 3a and the supporting plate 13 are respectively tightened by these pairs of nuts 14 from the top and underside. By adjusting the positions of the nuts 14 with respect to the threaded bars 12, the spacing between the upper plate 3a and supporting plate 13 of the wheeled carriage 3 can be controlled.

There is provided a backing holding plate 15 that is positioned above and in parallel with the supporting plate 13. Fixedly attached to the top face of the backing holding plate 15 is a hollow, rectangular-parallelepiped weld backing 16. The backing holding plate 15 is provided with projecting parts 15a which are positioned at the front and rear parts of the backing holding plate 15, projecting laterally. There are four struts 17 each of which is fixed to each projecting part 15a, projecting downwardly in a vertical direction therefrom. Each of the struts 17 penetrates through each eye hole 18 defined in the supporting plate 13, extending downward under the supporting plate 13. The tip of each strut 17 is provided with a retaining ring 17a. There are provided four compression springs 19 between the underside of the backing holding plate 15 and the top face of the supporting plate 13, each spring 19 encircling each of the struts 17. The provision of the compression springs 19 allows the weld backing 16 to be resiliently supported on the supporting plate 13.

An air cylinder 20 is attached to the underside of the backing holding plate 15 so as to be positioned at the center of the weld backing 16. The air cylinder 20 has a cylinder rod 20a penetrating through an eye hole 21 defined in the supporting plate 13 to extend downward under the supporting plate 13. At the tip of the cylinder rod 20a, there is fixedly attached an engaging piece 22 that is engageable with the supporting plate 13. By operating the air cylinder 20 to draw the cylinder rod 20a, the engaging piece 22 is brought into engagement with the underside of the supporting plate 13. This engagement allows the weld backing 16 to be pulled into place on the side of the supporting plate 13, against the energizing force of the compression springs 19.

Cylindrical follower element retainers 23 are screwed in the top face of the backing holding plate 15 at the corners thereof. Each of the follower element retainers 23 retains a follower element 24 at the center of the top face thereof. Each follower element 24 comprises a ball caster and is positioned so as to project upward slightly above the top face of the weld backing 16. The follower elements 24 turn being in contact with the underside of the workpiece 2, so that a specified spacing can be kept between the weld backing 16 and the workpiece 2. The positions of the follower element retainers 23 with respect to a vertical direction (i.e., the spacing between the weld backing 16 and the workpiece 2) can be controlled by adjusting the installation position of the follower element retainers 23 with respect to the backing holding plate 15.

There is provided a workpiece detection sensor 26 at one side of the weld backing 16. The workpiece detection sensor 26 comprises a proximity switch attached to a rectangular plate 25 secured to the top of the backing holding plate 15. The workpiece detection sensor 26 detects the presence or absence of the workpiece 2 in order to control the operation of the air cylinder 20. A detection piece 27 is attached to the rear end of the backing holding plate 15 as to extend downward, and a photoelectric detector 28 in the form of a groove is supported at the supporting plate 13, for detecting the detection piece 27. The photoelectric detector 28 detects the presence or absence of the detection piece 27 in order to judge whether the weld backing 16 is at an upper position or lower position.

Figure 4:
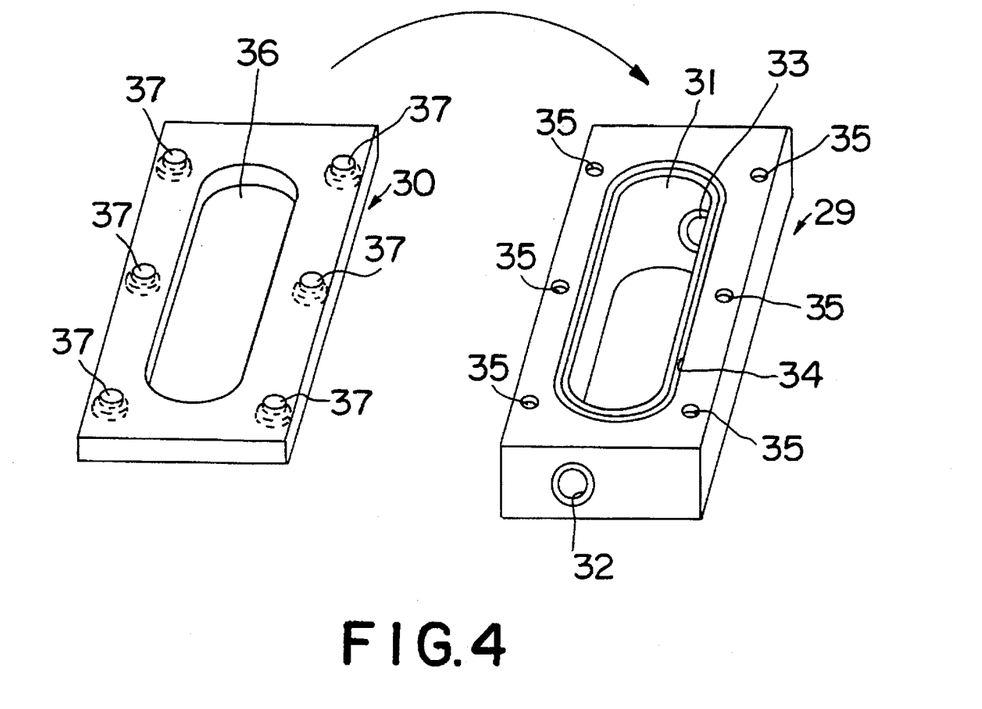
FIG. 4 is an exploded perspective view of a weld backing according to the first embodiment.
Figure 5:
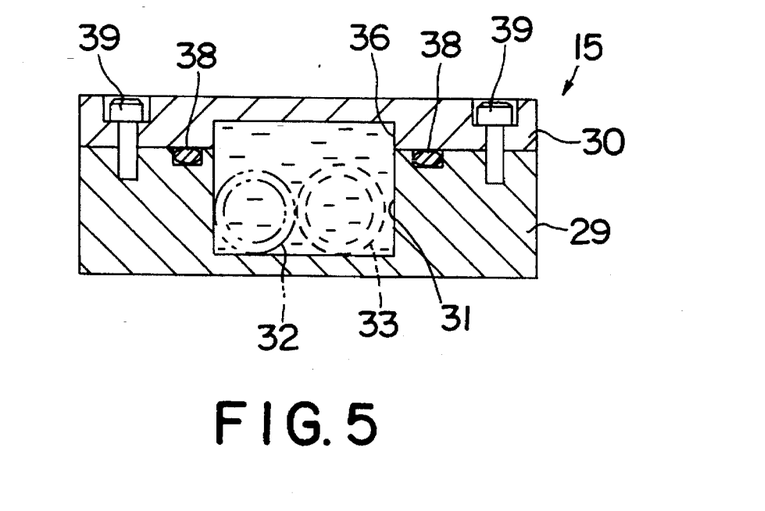
FIG. 5 is a sectional view of the weld backing according to the first embodiment.

As shown in FIGS. 4 and 5, the weld backing 16 comprises a cooling water box 29 and a backing member 30 which is overlaid on the top face of the cooling water box 29, like a lid. The interior space of the cooling water box 29 is a cooling water chamber 31. The cooling water chamber 31 has a cooling water inlet 32 at its front part and a cooling water outlet 33 at its back part. The cooling water inlet 32 and the cooling water outlet 33 are both communicated with the cooling water chamber 31 and positioned so as to be offset from each other. In such an arrangement, cooling water which has been introduced into the cooling water chamber 31 through the cooling water inlet 32 flows out of the weld backing 16 through the cooling water outlet 33. Running of the circulating cooling water cools the backing member 30 all the time. Formed on the top face of the cooling water box 29 is a ring groove 34 which surrounds an opening. Six threaded holes 35 are formed outside the ring groove 34. The backing member 30 is formed from a material of high thermal conductivity such as copper and its surface on the side of the workpiece 2 is coated with carbon in order to protect it from seizing. A cooling water chamber 36 is formed inside the backing member 30 at the center thereof. The cooling water chamber 36 has a contour identical to that of the opening of the cooling water box 29. Defined outside the cooling water chamber 36 are six rivet holes 37 which are arranged in positions corresponding to the threaded holes 35. The weld backing 16 having the above-described configuration is assembled in such a way that after a sealing member 38 such as an O-shaped ring or gasket has been fitted in the ring groove 34 of the cooling water box 29, the backing member 30 is overlaid on the cooling water box 29 as indicated by arrow of FIG. 4, so as to cover the opening of the cooling water box 29. Then, flush head rivets 39 are inserted into the rivet holes 37 of the backing member 30 and then threaded into the threaded holes 35 of the cooling water box 29. At the rear part of the wheeled carriage 3, a solenoid valve 40 for switching the operation of the air cylinder 20 and other control units are mounted and covered with a dust proof cover 41 (although the dust proof cover 41 is not shown in FIGS. 2 and 3).

Figure 6:
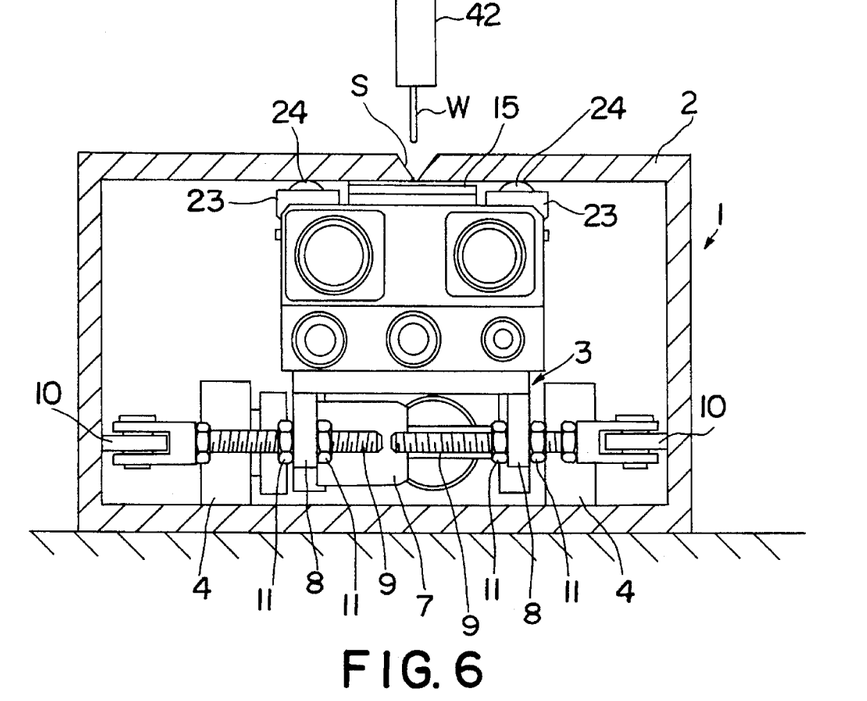
FIG. 6 is an explanatory diagram of the movable backing system according to the first embodiment, as it is operated in full penetration welding.
Figure 7:
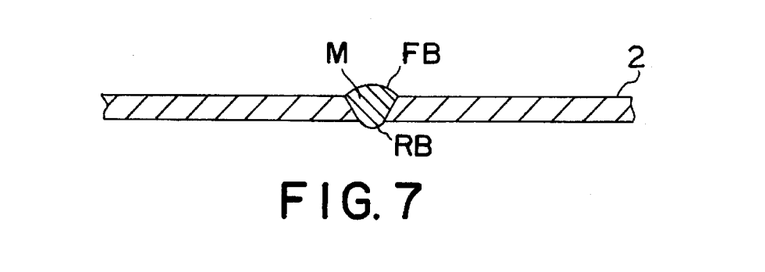
FIG. 7 is a sectional view of a workpiece which has been welded.

With reference to FIGS. 6 and 7, the operation of the movable backing system 1 having the above-described construction will be described, taking the case, in which full penetration welding is performed on the box-shaped workpiece 2, for example.

As the preparatory stage, the vertical position of the supporting plate 13 in relation to the wheeled carriage 3 is adjusted such as to conform with the spacing between the inner top wall and inner bottom wall of the workpiece 2 by adjusting the positions of the threaded bars 12; the lateral positions of the arms 9 are adjusted such as to conform with the spacing between the inner side walls of the workpiece 2 and such that the groove face S of the workpiece 2 is positioned just above the weld backing 16; and the installation positions of the follower element retainers 23 are adjusted such that the spacing between the underside of the workpiece 2 and the top face of the weld backing 16 becomes equal to the thickness of a penetration bead RB.

After the preparation, while the air cylinder 20 being operated to pull the weld backing 16 toward the supporting plate 13, against the energizing force of the compression springs 19, the wheeled carriage 3 is let in the interior space of the box-shaped workpiece 2 by actuating the DC servo motor 5. At that time, the position of the wheeled carriage 3 with respect to a lateral direction of FIG. 6 is restricted by the guide rollers 10 which are disposed at the tip of the arms 9 and move along the inner side walls of the workpiece 2. Thus, the wheeled carriage 3 moves along the weld line of the workpiece 2. The travel speed of the wheeled carriage 3 is controlled to be a specified speed by a control unit (not shown) based on the rotation speed of the wheels 4 detected by the rotary encoder 7.

After the wheeled carriage 3 has started to travel and the leading end of the workpiece 2 has been detected by the workpiece detection sensor 26, a detection signal is released to the control unit so that the air cylinder 20 is operated to move the cylinder rod 20a forward. The forward movement of the cylinder rod 20a allows the engagement piece 22 to be disengaged from the supporting plate 13, so that the weld backing 16 is raised by the energizing force of the compression springs 19 until the follower elements 24 come in contact with the underside of the workpiece 2. When the weld backing 16 accordingly reaches the upper position, the photoelectric detector 28 becomes conductive and thus detects the weld backing 16 in a normal position.

At this point, welding is started. A torch-like welder 42 moves in the same direction as the travel direction of the wheeled carriage 3, while, fusing a wire W to fill the groove face S of the workpiece 2. The wheeled carriage 3 moves synchronously with the movement of the welder 42. During the movement of the wheeled carriage 3, the follower elements 24 turn and move, being in contact with the underside of the workpiece 2 and welding operation thus progresses with the weld backing 16 being a specified distance kept away from the underside of the workpiece 2. When the workpiece detection sensor 26 detects the trailing end of the workpiece 2, the air cylinder 20 is operated to draw the cylinder rod 20a and the follower elements 24 are allowed to be out of the contact with the workpiece 2. In such welding operation, since the backing member 30, which directly contacts the penetration bead RB, is cooled by cooling water, the backing member 30 can be protected from damage caused by weld heat.

FIG. 7 shows a section of the weld zone obtained by full penetration welding.

As shown in the drawing, filler metal material M rises above the surface of the workpiece 2, forming a weld bead FB, while there is formed the penetration bead RB on the underside of the workpiece 2. The penetration bead RB is formed from the filler metal material M leaked through the root. After welding has been done, these weld bead FB and penetration bead RB are removed by grinding so that they become flush with the surface and rear face of the workpiece 2 respectively or they remain without undergoing such a finishing treatment.

Although the above description has been made taking the case for example, where full penetration welding is sequentially carried out with the wheeled carriage 3 moving from the leading end of the workpiece 2 to its trailing end, it is also possible to weld a local part of the workpiece 2 by the use of the movable backing system 1 according to this embodiment. In this case, the travel distance of the wheeled carriage 3 may be calculated from the rotation speed of the wheels 4 detected by the rotary encoder 7, and according to this calculation, the wheeled carriage 3 may travel automatically to a desired weld position.

In this embodiment, the movable backing system is provided with the wheeled carriage of the mobile type, however, the wheeled carriage is not necessarily limited to this type. For example, the wheeled carriage may be towed or pushed by the use of a pinion and rack mechanism driven by an independent actuator.

Although the movable backing system of the above embodiment includes arms that are secured to the wheeled carriage with nuts, the arms may be attached to the wheeled carriage through air cylinders and after letting the wheeled carriage in the interior space of, for example, a box-shaped workpiece, the arms may be extended by means of the air cylinders. The operation of the air cylinders can be controlled during the travel of the wheeled carriage, which makes it possible to adjust the position of the weld backing to conform with the weld line, even if the weld line is curved.

Figure 8:
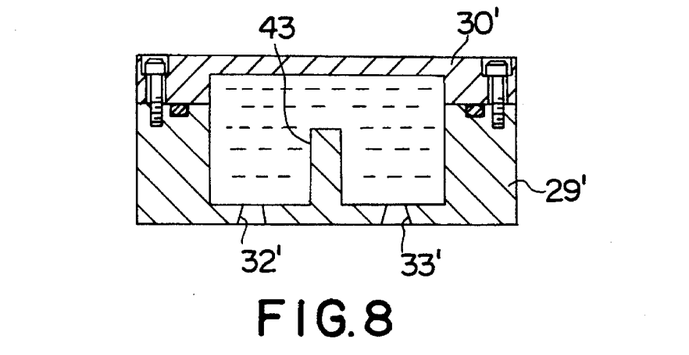
FIG. 8 is a sectional view of a weld backing according to a modified example of the first embodiment.
Figure 9:
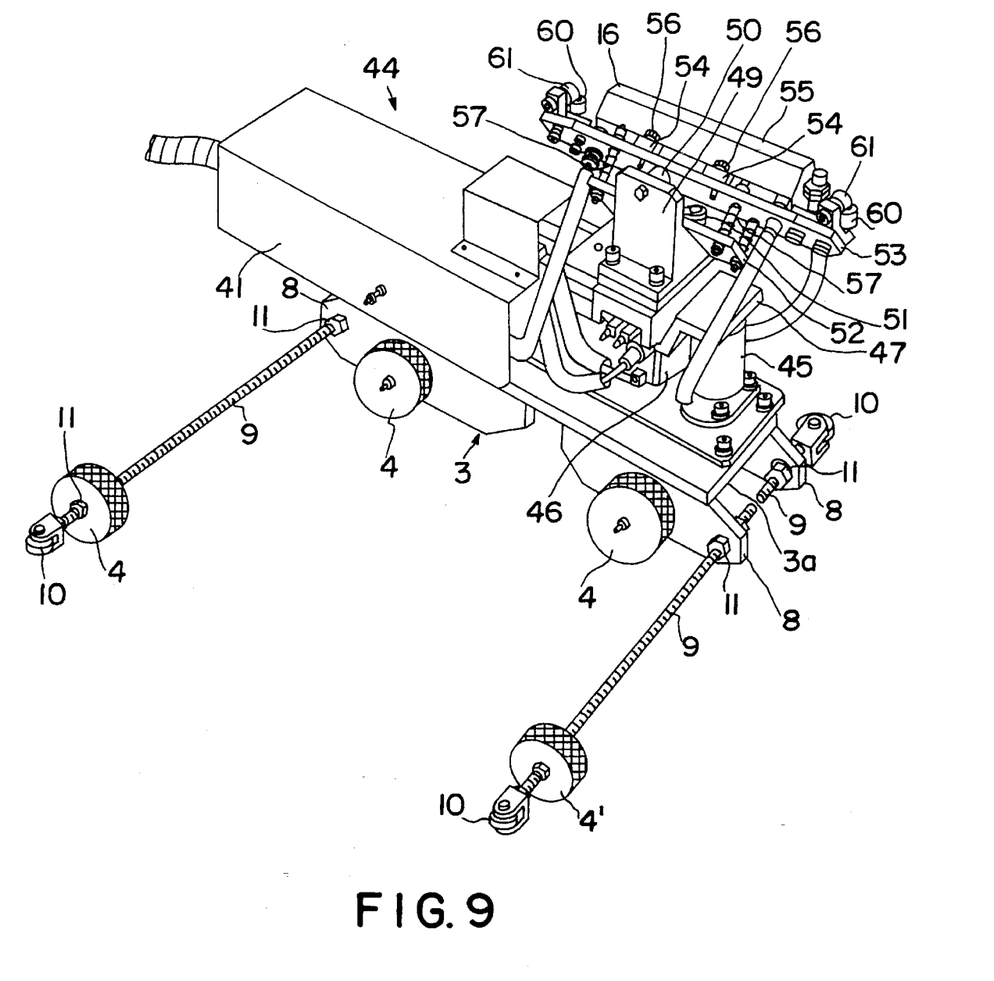
FIG. 9 is a perspective view of a movable backing system according to a second embodiment.
Figure 10:
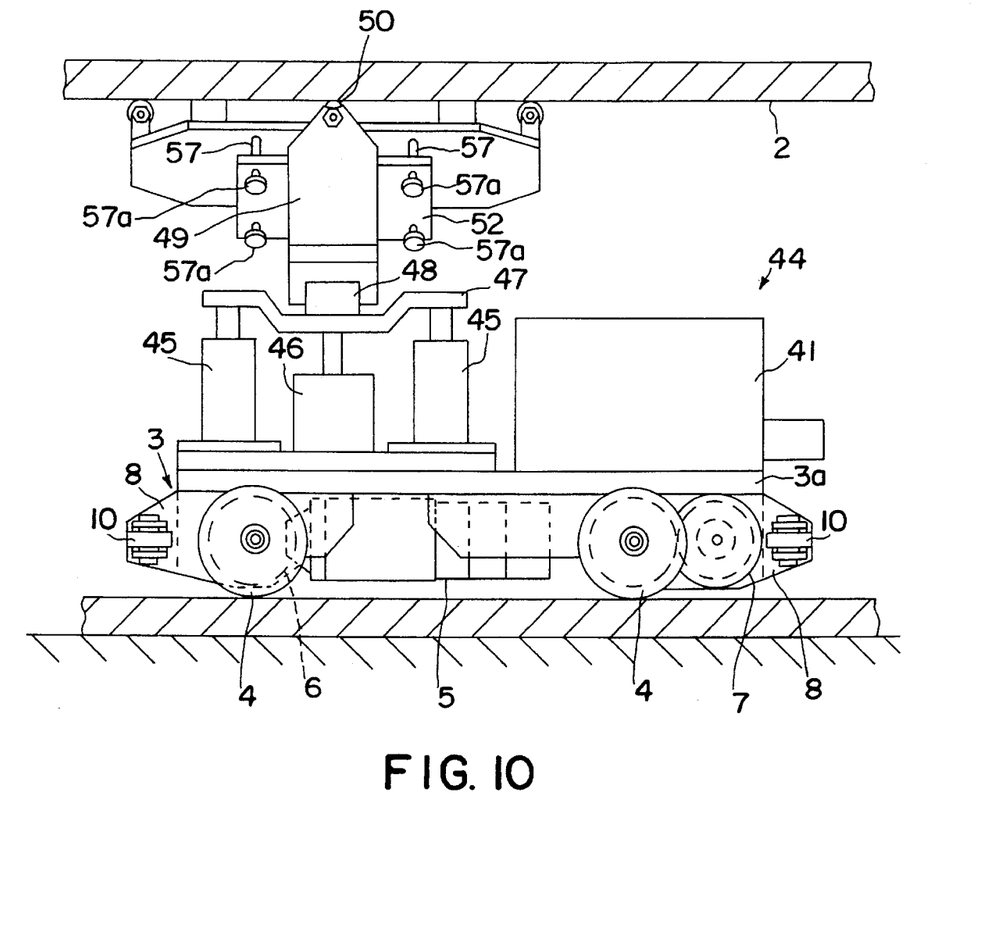
FIG. 10 is a side view of the movable backing system according to the second embodiment.
Figure 11:
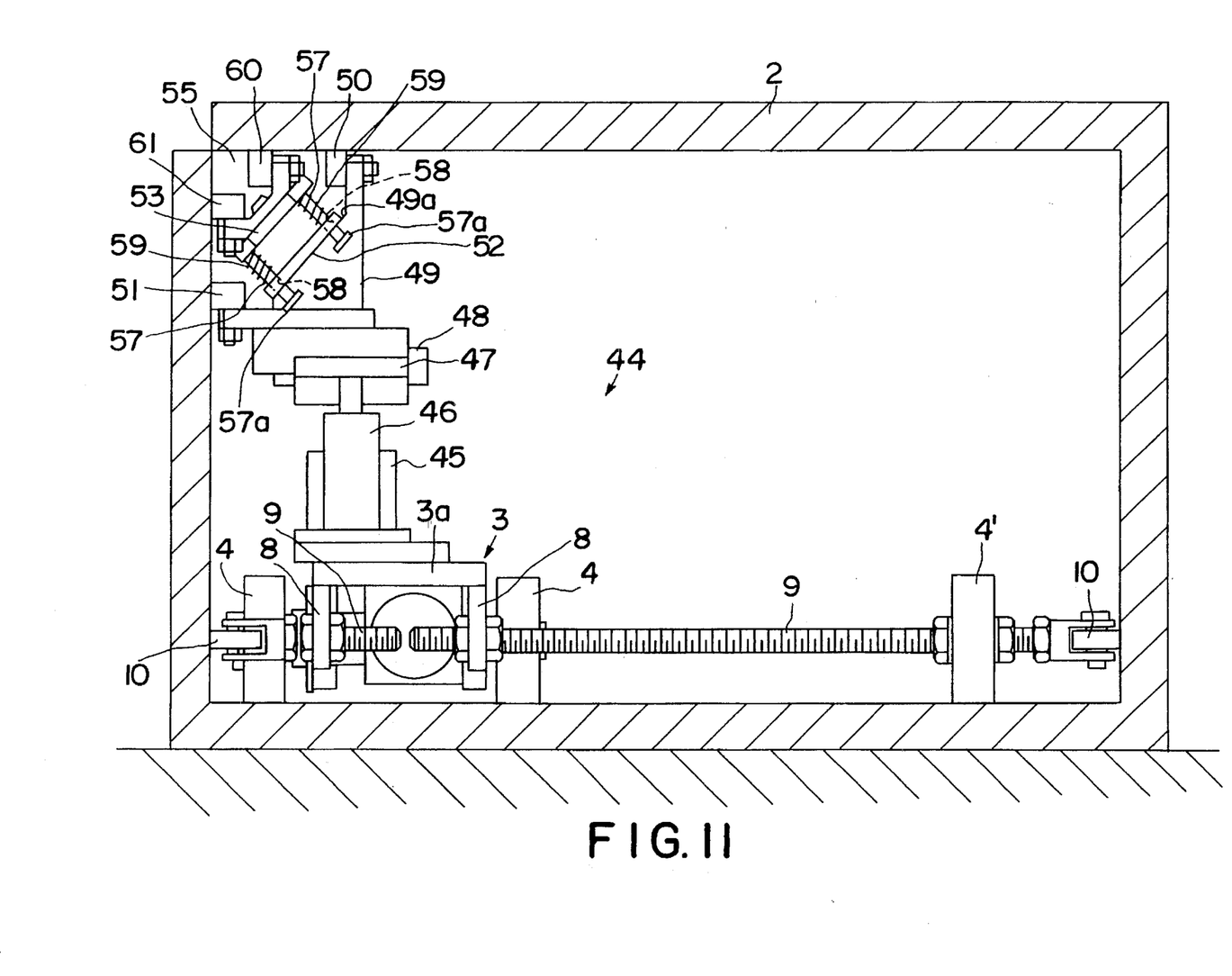
FIG. 11 is a rear elevation of the movable backing system according to the second embodiment.

The cooling water chamber construction of the weld backing of this embodiment could be modified. A modified example of the weld backing of this embodiment is shown in FIG. 8. According to the modified example, there are provided a cooling water inlet 32' and a cooling water outlet 33' at the right and left of the bottom of a cooling water box 29'. Disposed at the center of the bottom of the cooling water box 29' is a weir 43. The provision of the weir 43 prevents the direct flow of cooling water from the cooling water inlet 32' to the cooling water outlet 33', which enhances the cooling effects on the backing member 30'.

Referring to FIGS. 9 to 12, a second embodiment of the movable backing system of the invention will be hereinafter described. A movable backing system 44 according to the second embodiment is applied to the case of welding of a corner joint. The construction and function of the wheeled carriage and other members of the second embodiment are generally identical with those of the first embodiment. Therefore, only the characteristic features inherent to the second embodiment will be described in the following description. The parts that are substantially equivalent to the parts of the first embodiment are indicated in the drawings by the same numerals as used in the first embodiment and a detailed description on those parts will be omitted.

In the second embodiment, either one of the right and left arms 9 screwed in each bracket 8 of the wheeled carriage 3 is shorter than the other, and the longer arm 9 in each pair is provided with a wheel 4' in the vicinity of the tip thereof, for supporting the arm 9. Disposed above the upper plate 3a of the wheeled carriage 3 is a base 47 that can be freely lifted or lowered by a vertical motion air cylinder 46 through front and back struts 45. A movable member 49 is disposed at the center of the base 47. This movable member 49 can be freely moved in a lateral direction (i.e., a direction perpendicular to the travel direction of the wheeled carriage 3) along a guide member 48 fixed at the base 47, by means of a horizontal motion air cylinder (not shown). The movable member 9 includes, at one side, an inclined face 49a inclined at 45° with respect to the horizontal plane and guide rollers 50, 51 at the upper end and at a side. These guide rollers 50, 51 turn, being in contact with the upper wall and side wall of the workpiece 2, respectively. The inclined face 49a of the movable member 49 has a supporting plate 52 fixedly attached thereto, which is longer in size than the movable member 49 in a longitudinal direction. A backing holding plate 53 is disposed above and in parallel with the supporting plate 52. A weld backing 55 is fixed on the top of the backing holding plate 53 through two pedestals 54 and the position of the weld backing 55 is adjustable by means of adjusting bolts 56. Fixed to the backing holding plate 53 are four struts 57 projecting towards the supporting plate 52. Each strut 57 extends downward under the supporting plate 52, passing through an eye hole 58 formed on the supporting plate 52 and has a retaining ring 57a at the tip thereof. There are provided four compression springs 59 between the underside of the backing holding plate 53 and the top of the supporting plate 52, each encircling the strut 57. By the provision of the compression springs 59, the weld backing 55 is resiliently supported on the supporting plate 52. The backing holding plate 53 is equipped with guide rollers 60 and 61 at its front and rear ends respectively. The guide rollers 60, 61 turn, being in contact with the upper wall and side wall of the workpiece 2 respectively and function to maintain a predetermined spacing between the weld backing 55 and the workpiece 2.

Figure 12A:
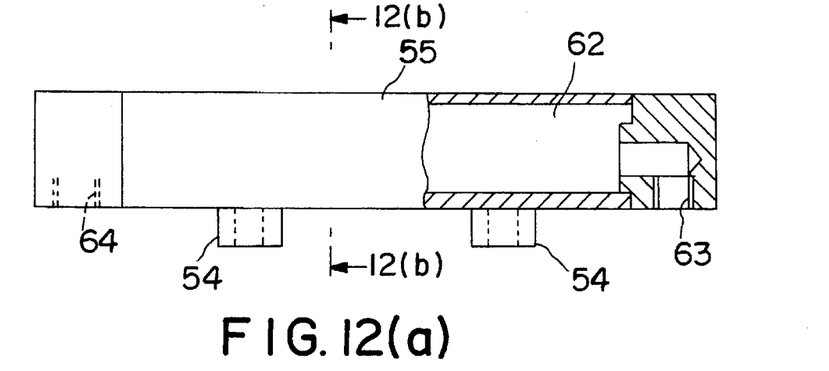
FIG. 12(a) is a partly sectional side view showing the details of the structure of the weld backing according to the second embodiment.
Figure 12B:
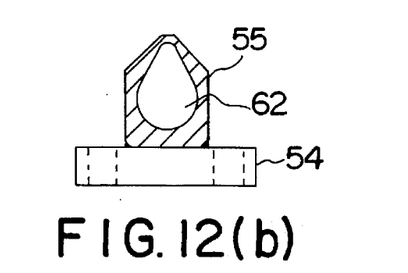
FIG. 12(b) is a sectional view taken along line A—A of FIG. 12(a)

The weld backing 55 of this embodiment is substantially pentagonal in section and its tip portion is chamfered as shown in FIGS. 12(a) and 12(b) so that the weld backing 55 snugs in the corner of the workpiece 2. Like the first embodiment, the interior space of the weld backing 55 is a cooling water chamber 62 communicating with a cooling water inlet 63 and a cooling water outlet 64.

According to the movable backing system of the second embodiment, the wheeled carriage 3 moves along the weld line, with the weld backing 55 set in the corner of the workpiece 2, whereby the guide rollers 10 provided at the tip of the arms 9 are guided along the inner side walls of the workpiece 2 and the guide rollers 50, 51, 60 and 61 are guided along the upper wall and side wall of the workpiece 2. With such an arrangement, the corner joint of the workpiece 2 in the form of, for example, a box can be continuously, easily welded.

Figure 13A:
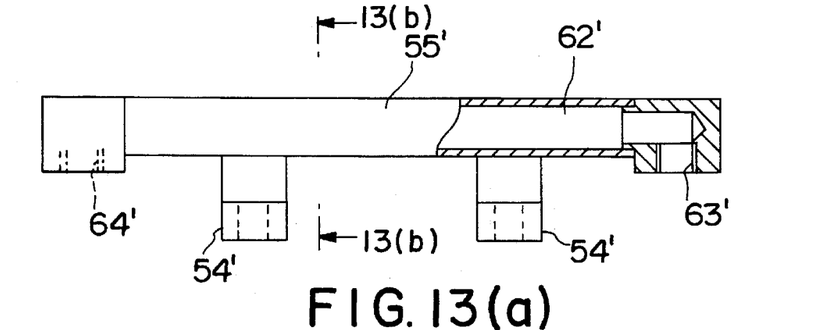
FIG. 13(a) is a partly sectional side view of a weld backing according to a modified example of the second embodiment.
Figure 13B:
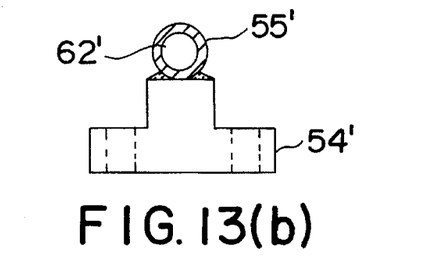
FIG. 13(b) is a sectional view taken along line B—B of FIG. 13(a).

The weld backing mounted on the top of the backing holding plate 53 could be produced in other shapes, according to the configurations of penetration beads required. FIGS. 13(a) and 13(b) show a modified example of the weld backing used in the second embodiment. A weld backing 55' according to the modification is formed into a cylindrical shape in order to obtain a rounded, smooth penetration bead. This weld backing 55' is secured to inverted T shaped pedestals 54'. In FIG. 13, reference numeral 62', 63' and 64' represent a cooling water chamber, cooling water inlet and cooling water outlet, respectively.

The movable backing system of the second embodiment can be modified. For example, the arms may be so attached to the wheeled carriage to be telescopic in relation to the wheeled carriage 3, just like the first embodiment.

Industrial Applicability

According to the invention, even if a workpiece to be welded is long or it has a curved weld line, full penetration welding can be continuously, easily performed along a weld line within a confined space such as box-shaped articles, irrespective of the length, configuration and other factors of a weld zone.

The backing member is cooled by cooling means all the time, and therefore heat damage to the backing member can be minimized. Further, if the backing member gets damaged owing to wear or the like, the damaged part can be replaced, so that the material cost, processing cost and the number of processes can be considerably reduced, compared to conventional systems.

We claim:

1. A movable backing system for use in full penetration welding, placed at the underside of a workpiece during welding, the system comprising:

(a) a wheeled carriage movable along a weld line of a weld zone in the workpiece;

(b) a weld backing which is so supported on the wheeled carriage as to be movable toward the workpiece and which has a backing member disposed on the side facing the workpiece and cooling means disposed inside the weld backing, for cooling the backing member;

(c) follower elements attached to the weld backing, which are always in contact with the underside of the workpiece and which turn following the movement of the workpiece to keep a predetermined gap between the underside of the workpiece and the weld backing so that desired bead thickness can be obtained; and (d) an elastic member for energizing the weld backing to bring the follower elements into contact with the underside of the workpiece constantly.

2. The movable backing system as claimed in claim 1, wherein the wheeled carriage is provided with a cylinder for moving the weld backing apart from the workpiece against the energizing force of the elastic member.

3. The movable backing system as claimed in claim 1, wherein the wheeled carriage is provided with a plurality of arms which project from both sides of the wheeled carriage in directions transverse to the travel direction of the wheeled carriage and each of which has, at its leading end, a guide roller for guiding travel of the wheeled carriage.

4. The movable backing system as claimed in claim 3, wherein the arms are telescopic so that they can be stretched and shrunk by cylinders.

5. The movable backing system as claimed in claim 1, wherein the wheeled carriage is of the mobile-type.

6. The movable backing system as claimed in claim 5, wherein the wheeled carriage moves synchronously with the movement of a welder.

7. The movable backing system as claimed in claim 1, wherein the wheeled carriage moves, being pulled or pushed by a driving unit composed of a rack and pinion mechanism.

8. The movable backing system as claimed in claim 7, wherein the wheeled carriage moves synchronously with the movement of a welder.

9. The movable backing system as claimed in claim 1, wherein the cooling means is cooling water circulating within the weld backing.

10. The movable backing system as claimed in claim 9, wherein the cooling water is introduced from an inlet positioned on one side of the hollow, rectangular-parallelepiped weld backing and discharged from an outlet positioned on the other side of the weld backing, and the inlet and outlet are positioned so as to be offset from each other.

11. The movable backing system as claimed in claim 9, wherein the cooling water is introduced from an inlet positioned at the bottom of the hollow, rectangular-parallelepiped weld backing and discharged from an outlet positioned at the bottom of the weld backing, and a weir is disposed in a place of the bottom situated between the inlet and the outlet.

12. The movable backing system as claimed in claim 1, wherein the weld backing includes detecting means for detecting the presence of the workpiece.

13. The movable backing system as claimed in claim 1, wherein the wheeled carriage includes detecting means for detecting the travel speed of the wheeled carriage.

14. The movable backing system as claimed in claim 1, wherein the wheeled carriage travels inside the box-shaped workpiece to perform full penetration welding of the workpiece.

15. The movable backing system as claimed in claim 14, wherein the weld zone is a butt joint.

16. The movable backing system as claimed in claim 1, wherein the weld backing is mounted on the wheeled carriage such that it is inclined at a predetermined angle in a direction transverse to the travel direction of the wheeled carriage and such that it is movable toward the inclining direction.

17. The movable backing system as claimed in claim 16, wherein the wheeled carriage has a base that can be moved up and down by means of a vertically operated cylinder and the weld backing is mounted on the base such that it can be horizontally moved by means of a horizontally operated cylinder.

18. The movable backing system as claimed in claim 16, wherein the wheeled carriage is provided with a plurality of arms which project from both sides of the wheeled carriage in directions transverse to the travel direction of the wheeled carriage and each of which has, at its leading end, a guide roller for guiding travel of the wheeled carriage.

19. The movable backing system as claimed in claim 18, wherein the arms are telescopic so that they can be stretched and shrunk by cylinders.

20. The movable backing system as claimed in claim 16, wherein the arms positioned on one side of the wheeled carriage are longer than the length of the arms positioned on the other side of the wheeled carriage, and the longer arms respectively have, in the vicinity of their leading ends, a wheel for supporting the arm.

21. The movable backing system as claimed in claim 16, wherein the wheeled carriage is of the mobile-type.

22. The movable backing system as claimed in claim 21, wherein the wheeled carriage moves synchronously with the movement of a welder.

23. The movable backing system as claimed in claim 16, wherein the wheeled carriage moves, being pulled or pushed by a driving unit composed of a rack and pinion mechanism.

24. The movable backing system as claimed in claim 23, wherein the wheeled carriage moves synchronously with the movement of a welder.

25. The movable backing system as claimed in claim 16, wherein the cooling means is cooling water circulating within the weld backing.

26. The movable backing system as claimed in claim 16, wherein the weld backing includes detecting means for detecting the presence of the workpiece.

27. The movable backing system as claimed in claim 16, wherein the wheeled carriage includes detecting means for detecting the travel speed of the wheeled carriage.

28. The movable backing system as claimed in claim 16, wherein the weld backing is substantially pentagonal in section with the leading end chamfered, and the chamfered end is positioned so as to face a corner of the workpiece.

29. The movable backing system as claimed in claim 16, wherein the weld backing is tubular in shape.

30. The movable backing system as claimed in claim 16, wherein the wheeled carriage travels inside the box-shaped workpiece to perform full penetration welding of the workpiece.

31. The movable backing system as claimed in claim 30, wherein the weld zone is a butt joint.

* * * * *